L. E. WATERMAN.
PLANTER.
APPLICATION FILED DEC. 16, 1915.
1,275,333.
Patented Aug. 13, 1918.
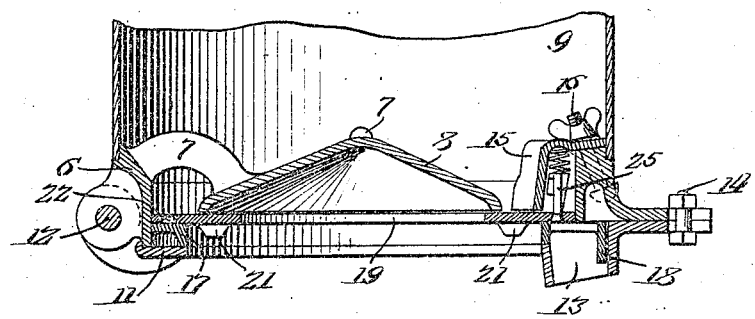
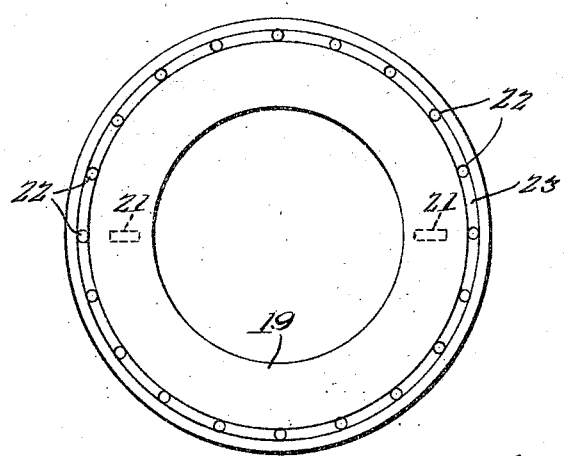
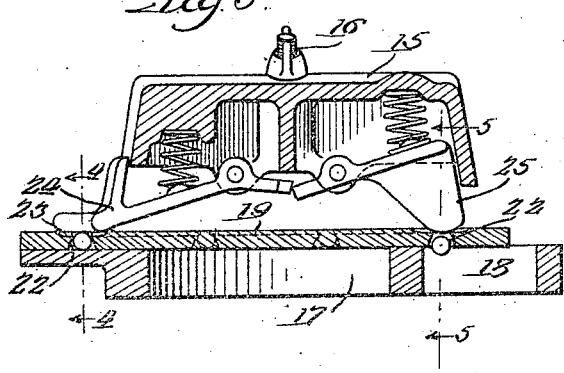
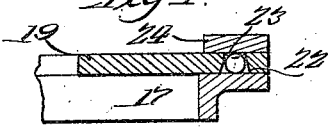
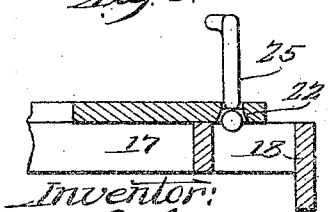
Inventor:
Lewis E. Waterman
By Pond & Wilson
Attys.

UNITED STATES PATENT OFFICE.

LEWIS E. WATERMAN, OF ROCKFORD, ILLINOIS, ASSIGNOR TO EMERSON-BRANTINGHAM COMPANY, OF CHICAGO, ILLINOIS, A CORPORATION OF ILLINOIS.

PLANTER.

1,275,333.

Specification of Letters Patent.

Patented Aug. 13, 1918.

Application filed December 16, 1915. Serial No. 67,203.

*To all whom it may concern:*

Be it known that I, LEWIS E. WATERMAN, a citizen of the United States, residing at Rockford, in the county of Winnebago and State of Illinois, have invented certain new and useful Improvements in Planters, of which the following is a specification.

This invention relates in general to planters and listers and has more particular reference to improvements in the seed boxes thereof and to the seed plates which contain cells for the reception of seed and are adapted to be rotated in the seed box to feed seed therefrom to a discharge chute.

Seed boxes are now generally designed to employ any one of a plurality of interchangeable seed plates of substantially equal thickness and each especially adapted for planting seed of a particular specie, character or size. However, because of the variance in shape and size of certain specie of seed, for example, the ordinary seed corn and the round pea-shaped corn seed known as feterita, milo-maize, Kafir corn, etc., considerable difficulty has been encountered in providing seed plates that will handle the latter species of seed in a satisfactory manner and be interchangeable in the ordinary seed box. These seed boxes employ a rotary seed plate provided with circumferentially spaced seed cells and a device located adjacent to the seed discharge chute embodying a cut-off and a knocker, which coöperate with the seed plate. The cut-off permits only such seeds as are located in the cells to approach the discharge chute and the knocker is adapted to sufficiently enter a cell disposed over the chute to dislodge the seed from the cell so that it will fall into the chute. Since Kafir corn seed and other seed of this general species is generally drilled in rather than planted in hills, it is desirable that each seed cell contain but one seed, so that the seeds will be planted uniformly. The seed plates heretofore used for this purpose and designed to be interchangeable in the ordinary seed boxes have been so constructed that frequently two or three seeds might enter a seed cell and become wedged therein, which, of course, precluded uniform drilling.

The primary object of my invention, therefore, is to provide an improved seed plate for uniformly planting feterita, milo-maize, Kafir corn, sorghum, etc., at the rate of a single seed to each seed cell of the plate.

My invention also contemplates the provision of a seed plate of this general character which will be readily interchangeable in seed boxes of a type now generally employed for planting various kinds of seed, especially the ordinary corn seed.

My invention, its mode and principle of operation, and its advantages will be readily understood by reference to the following description when considered in connection with the accompanying drawings, wherein—

Figure 1 is a vertical sectional view through the lower portion of the seed box embodying my improvements;

Fig. 2 is a plan view of my improved seed plate;

Fig. 3 is an enlarged vertical sectional view taken longitudinally through the cut-off cap; and Figs. 4 and 5 are fragmentary sectional views taken on the lines 4—4 and 5—5 of Fig. 3.

Referring to the drawings, Fig. 1 shows the lower portion of a seed box, the same comprising an annular hopper base 6 to which is connected through the medium of arms 7 a cone-shaped seed box bottom 8 and a hopper 9. A floor plate 11 is hinged at 12 to the base member 6 and provided with a discharge chute 13, the bottom plate and hopper base being connected opposite the hinged side of the hopper by a bolt 14 which permits the hopper to be swung back on the pintle 12 for changing seed plates. In this type of seed box, seed plates for ordinary seed corn are adapted to rotate directly on the floor plate 11 and to be rotated by mechanism not shown, the plates being formed with peripherally disposed seed cells adapted to register with the discharge conduit 13. The seed plates are also of such depth or thickness that their top faces just clear the under side of the seed box bottom 8.

My improved seed plate, however, is comparatively thin, and in order that it may be employed in seed boxes of this character, it is necessary to provide a supplemental mounting for said plate. In this instance I have provided a filler ring 17 mounted on the floor plate 11 and formed with a flat top face and a conduit portion 18 disposed above and having its outer wall entered into the discharge conduit 13 of the floor plate for holding the filler ring against rotation.

My improved seed plate designated in general by reference character 19 is mounted to rotate on the top face of the filler ring 17 and is adapted to be rotated by mechanism not shown, but which engages the downwardly projecting lugs 21 on the plate. The plate is of a thickness substantially equal to the diameter of the seed to be planted. It should be here noted that my improvements relate particularly to the planting of pea-shaped seed such as feterita and milo-maize, which are substantially the same size and may be used with a plate of a given thickness, and Kafir corn, sorghum and broom corn seed which is slightly smaller in diameter than the former seed and requires a slightly thinner seed plate. The portion of the plate 19 resting on the filler ring 17 is provided with a plurality of circumferentially spaced seed cells in the form of round apertures 22, the diameter of which at the top face of the plate is but slightly greater than that of the seeds. Thus, but a single seed may enter a cell and the seed when located therein will substantially fill the cell, the top of the seed being about flush with the top face of the plate as shown clearly in Figs. 3 and 4. The plate is also formed with a shallow annular groove 23 concave in cross-section, connecting the seed cells 22 for a principal purpose hereinafter mentioned, it being here noted that this groove facilitates filling the cells since the seeds will readily locate themselves in the groove and, as the plate is rotated, will be guided into the cells thereof. It will also be observed that the walls of the cells are tapered so as to diverge downwardly from their entrance end.

Cut-off means of any suitable or preferred type may be employed, and in the present instance, I have shown such means in the form of a cap or housing 15 detachably secured above the discharge conduit 13 and the seed plate by means of a bolt 16 to the hopper base 6. Within the cap 15 is pivotally mounted a pair of spring pressed feet constituting what is well known in this art as a cut-off 24 and a knocker 25. The foot of the cut-off is comparatively broad and flat so as to overlie seed cells of various widths and preclude entrance of seed beneath the cap 15 except such seed as is disposed in the seed cells. It will be noted, viewing Figs. 3 and 4, that the seed in the cells, which rests on the filler ring 17 and is of substantially the same diameter as the thickness of the seed plate, passes beneath the cut-off without being injured thereby and that the upper portion of this seed projects into the groove 23. The foot of the knocker 25, which is relatively narrow, is constantly urged into the groove 23 by a suitable spring so that when a seed-laden cell is moved past the knocker by rotation of the seed plate, the knocker will depress the seed until it is entirely free from the upper edge of the cell so that it will drop into the discharge conduit. Of course, if the seed does not bind against the walls of a cell, it will, when carried over the discharge conduit, fall by its own weight thereinto, but in many instances, and in order to insure positive discharge of the seeds, the provision of a knocker for the purpose described is essential. It should also be noted that it is essential for the knocker 25 to pass below the top surface of the plate at the fore side of a cell so as to engage and depress a seed which may be slightly wedged in the cell and thus to insure positive seed discharge. It will be manifest that since the knocker 25 is designed to coöperate with comparatively large seed cells, such as are found in the ordinary corn seed plate, its function would be largely precluded if there were no depression or groove permitting the knocker to effectively engage a seed in a comparatively small cell.

In the operation of a planter in which the seed box contains my improved seed plate, it will be apparent that pea-shaped seed corn or other seed of the character described may be uniformly planted, one seed from each cell. In the event that it is desired to plant the ordinary seed corn, which is materially different in size and shape from the pea-shaped seed described, the hopper 9 will be swung back on its pintle leaving the plate 19 and the filler ring 17 resting on the floor plate 11. The said plate and filler ring will then be removed and the desired seed plate may be positioned on the bottom plate 11 and the new seed plate of a thickness substantially equal to the combined thickness of the plate 19 and filler ring 17 will be positioned on the bottom plate 11.

I claim:

Means for planting comparatively small round seeds, one at a time, comprising in combination, a suitable seed box having a discharge opening, a seed plate rotatably mounted in the bottom of the box and having an annular cell-containing portion of a thickness substantially equal to the mean diameter of the seeds to be planted, said cell-containing portion being formed with a plurality of circumferentially spaced seed cells, the top of which are substantially round and of a diameter slightly greater than the mean diameter of the seeds to be planted and which are tapered so as to diverge downwardly, the top surface of the seed plate being formed with an annular shallow groove connecting the seed cells, whereby to facilitate entrance of seeds thereto and also whereby a seed disposed in a cell will project into the groove-way, cut-off means arranged to allow carriage to the discharge opening of only those seeds disposed in the seed cells, and a yieldingly depressed knocker shaped to fit and ride in said groove, so that as each seed cell is moved past the knocker that portion of the seed projecting into the path of the knocker will be engaged and forced downwardly by the latter as the same passes over the cell, thereby insuring discharge of the seed from the cell.

LEWIS E. WATERMAN.